July 7, 1931. O. T. MINOR 1,813,631
STALK CUTTER ATTACHMENT FOR TRACTORS
Filed Aug. 16, 1930 3 Sheets-Sheet 1

Inventor
O. T. Minor
By Clarence A. O'Brien
Attorney

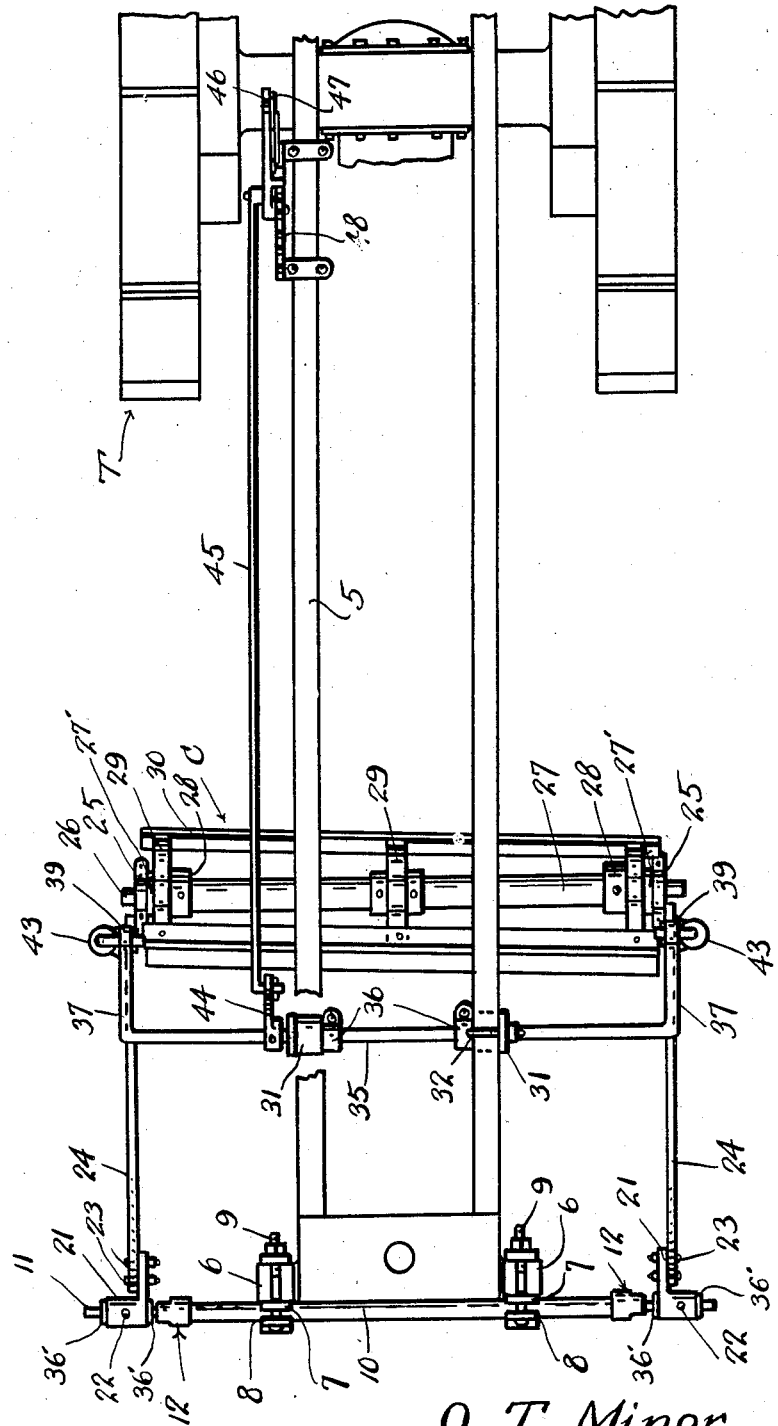

July 7, 1931.  O. T. MINOR  1,813,631
STALK CUTTER ATTACHMENT FOR TRACTORS
Filed Aug. 16, 1930   3 Sheets-Sheet 3
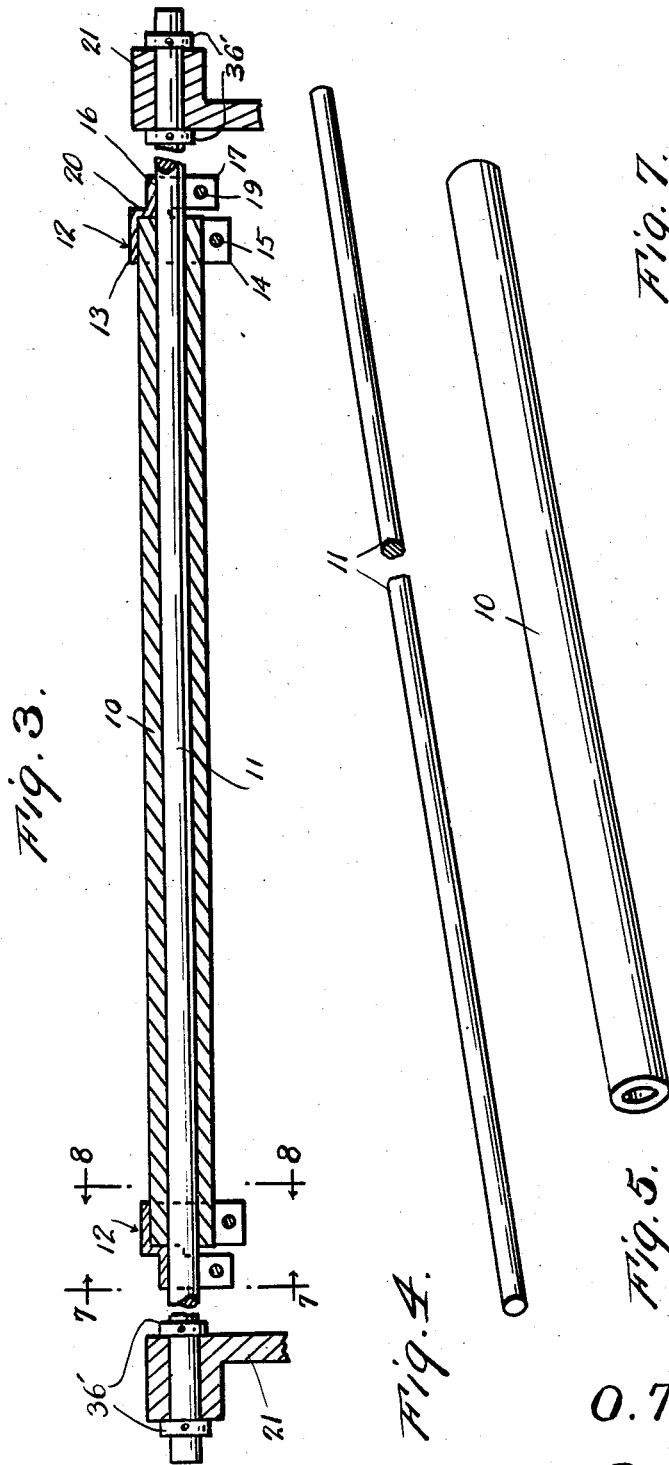
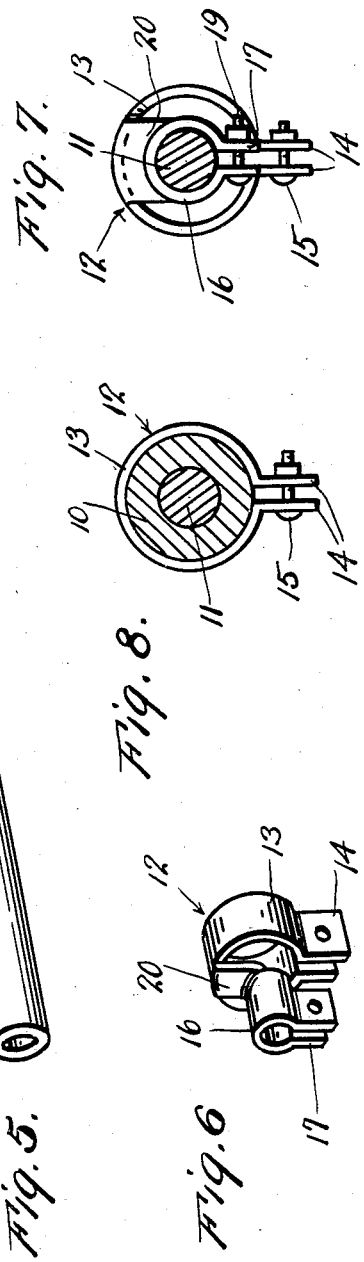
Inventor
O. T. Minor
By Clarence A. O'Brien
Attorney

UNITED STATES PATENT OFFICE

OSCAR THOMAS MINOR, OF MAYFIELD, OKLAHOMA

STALK CUTTER ATTACHMENT FOR TRACTORS

Application filed August 16, 1930. Serial No. 475,807.

This invention relates broadly to new and useful improvements in stalk cutters, and the primary object of this invention is to provide a stalk cutter in the nature of an attachment adapted to be readily and easily secured to a tractor especially of the conventional type.

A still further object of the invention is to provide a stalk cutter attachment for farm-all tractors, which may be readily controlled by the operator of the tractor.

Other objects and advantages of the invention will become apparent after a study of the following description taken in connection with the accompanying drawings wherein:—

Fig. 2 is a fragmentary top plan view of the attachment, the same being shown as secured to the chassis frame of the tractor.

Fig. 3 is a longitudinal view of partly in section and partly in elevation, for clearly illustrating certain details of construction, hereinafter more fully referred to.

Fig. 4 is a perspective view of one of the supporting shafts.

Fig. 5 is a perspective view of the sleeve forming part of the section.

Fig. 6 is a perspective view of a column forming part of the invention.

Figure 1:
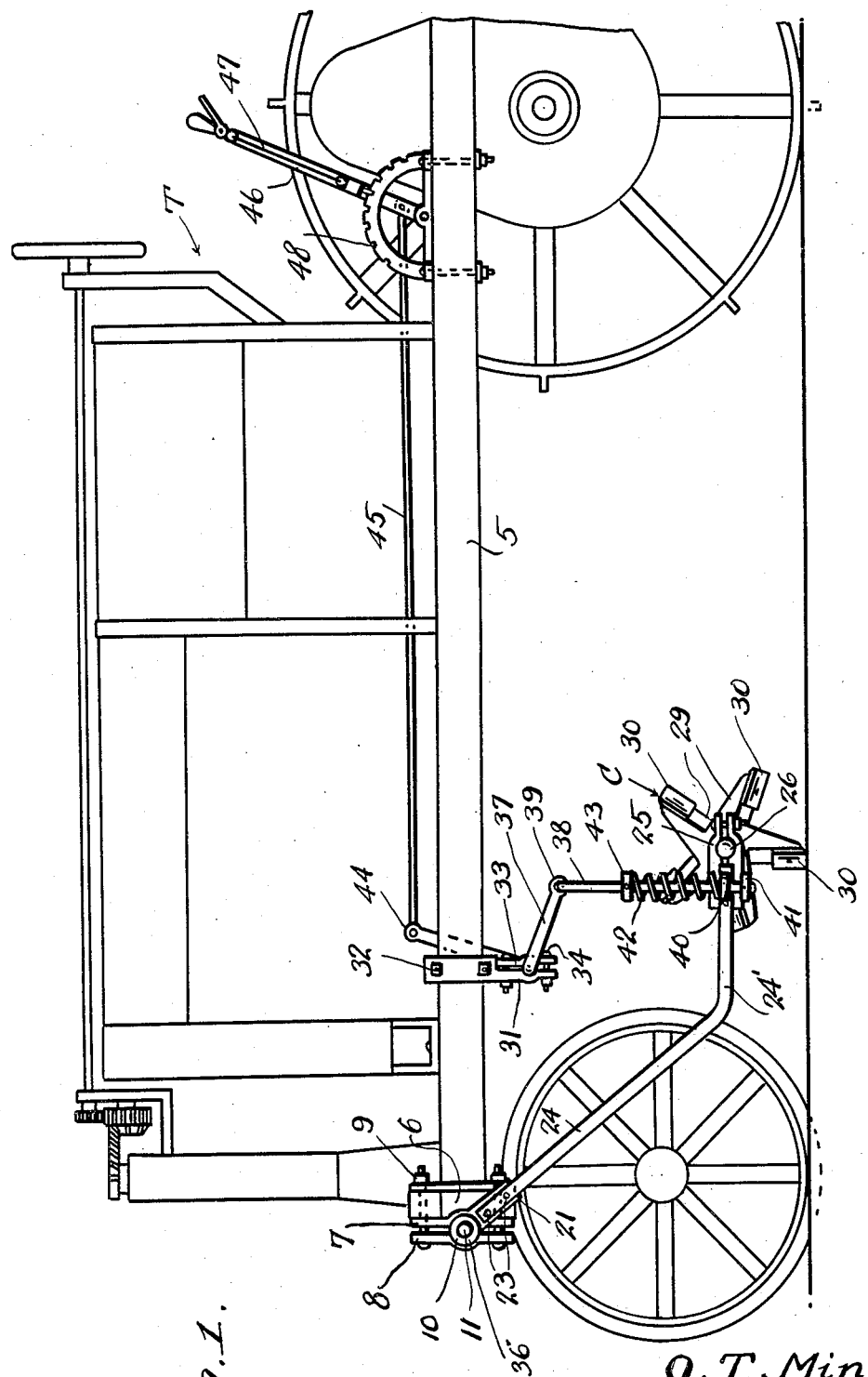
Figure 1 is a side elevational view of a conventional type of tractor illustrating the manner of mounting my attachment thereto, the rear wheel on one side of the tractor being removed.

Figs. 7 and 8, are detail sectional views taken substantially on the line 7—7 and 8—8 respectively of Fig. 3.

With reference more in detail to the drawings, it will be seen that the reference character T indicates generally a tractor which includes among other parts, spaced parallel bars 5—5. The tractor T also has as a part of its conventional structure, pairs of apertured lugs or plates 6, one adjacent each of the chassis bars 5 at the forward end of the tractor.

According to the present invention, there is rigidly secured at the plate 6 a clamp 7 provided with the usual clamping cap 8, the clamps 7 and the caps 8 being in assembled relationship on the plates 6, through the medium of bolts and nuts designated generally by the reference character 9.

A transversely disposed sleeve 10 is supported in the clamps 7. Fixedly supported in the sleeve 10 and projecting beyond the ends of the sleeve is a shaft 11.

At the ends of the sleeve 10 there are provided collars designated generally by the reference character 12. The collars 12 respectively comprise a relatively large split sleeve 13 provided with opposed apertured lugs 14 for accommodating a bolt 15 for retaining the sleeve 13 about the end of the said sleeve 10.

The said collars 12 each further comprise a relatively smaller sleeve 16 that is provided with a pair of opposed apertured lugs 17, and accommodate a bolt 19 for retaining said sleeve 16 about an adjacent end portion of the shaft 11. The sleeve 16 is disposed concentrically with respect to the sleeve 13 and secured thereto through the medium of a connecting web 30.

The shaft 11 has rotatably mounted on each end thereof, a crank arm 21 provided with a suitable lubricating hole 22. Collars 36' retain the bearing portions of arms 21 in position on shaft 11.

To the arm 21 there is bolted as at 23, a supporting bar 24. Each of the supporting bars 24 at its lower end is provided with a laterally disposed clamp 25. Supported in the clamps 25 and extending transversely of the tractor rearwardly of the forward end thereof is a cutter supporting shaft 26.

The cutter supported on the shaft 26 is designated generally by the reference character C. The cutter C comprises an elongated sleeve 27 rotatably supported on the shaft 26. A plurality of spiders are keyed to the sleeve 27, one inwardly at each end of the sleeve, and one intermediate the ends of the sleeve. Each of the said spiders comprises a hub 28 suitably keyed to the sleeve, and radiating from the hub 28 is a plurality of spokes 29. The spiders are connected together through the medium of elongated cutting blades 30 that are secured at their outer ends of the spokes 29.

Manifestly, as the tractor moves over the ground, and the blades 30 come into contact with the stalks to be cut, the cutters, including sleeve 27, the spiders, and blades 30 secured to the spokes of the spiders will be rotated about the shaft 26 for cutting the stalks.

Engaging the corresponding ends of sleeve 27 and axle shaft 26, are suitable grease glands or caps 27', a portion of which caps are disposed about the ends of the sleeve 27, and the remaining portions disposed about the ends of the axle shaft 26 between the ends of the sleeve 27 and the clamps 25.

These glands or caps 27' will retain grease or lubricants within the sleeve 27 and at the same time will prevent dirt, dust, or the like gaining access into the sleeve 27.

Secured to the chassis bar 5 inwardly of the forward end of the chassis bars is a bearing 31 that is secured to the chassis bar through the medium of a suitable U-bolt 32. Each of the bearings 31 is equipped with the usual bearing cap 33 held in assembled relation through the usual nut and bolt connection 34. The bearings 31 are arranged in transverse alinement and support transversely of the tractor a rock shaft 35.

Collars 36 are provided on the rock shaft 35 to engage the bearings 31 for retaining said rock shaft against endwise or longitudinal movement.

At each end thereof, the rock shaft 35 is provided with a rocker arm 37. Each of the bars 24 at its free lower end is bent to provide an angularly disposed terminal 24' that is operatively connected to one of the rocker arms 37 through the medium of a connecting rod 38.

Each of the rods 38 at its upper end is suitably formed to engage an eye 39 formed in the free end of the rocker arm 37, while the lower end of the respective connector rods 38 extend through an apertured lug 40 formed on the free end of the terminal 24.

At the lower end thereof the connector 38 is also provided with a suitable collar 41 to engage the lug 40 to prevent complete removal of the lower end of the rod 38 from the lug 40. A coil spring 42 is convoluted about the lower portion of the rod 38, and one end of the coil spring bears against the lug 40, and the upper end of the spring bears against a collar 43 on the rod 38 adjacent the upper end of the rod.

Also suitably keyed to the rocker shaft 35 inwardly from the end thereof is a crank arm 44 that has a link connection 45 with a control lever 46 pivotally mounted upon the stationary part of the tractor at the rear of the tractor and in convenient reach of the operator of the tractor. The control lever 46 is equipped with a suitable detent structure 47 for cooperation with a rack segment 48, secured to the outer end of the chassis bars 5.

Obviously by rocking the lever 46 the shaft 35 will be rocked, thus rocking the arm 24 for moving the cutter C to raise or lower the latter for adjusting the cutter relative to the ground as may be required according to the length of the stalks to be cut.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:—

1. A stalk cutter attachment for tractors comprising a pair of forwardly disposed brackets mounted on the tractor; a sleeve supported between said brackets, a shaft rotatably mounted in said sleeve, and having its ends extending beyond the corresponding ends of said sleeve, a collar on each end of said sleeve, and including a relatively large cylindrical portion embracing the sleeve, and a relatively smaller cylindrical portion embracing the shaft, arms mounted on the shaft for rocking movement therewith, said arms extending downwardly and rearwardly, a second shaft rotatably supported between said arms and connecting the free ends of said arms, a cutter mounted on said shaft for rotation therewith, a rock shaft, means for supporting said rock shaft on the tractor rearwardly of said sleeve, yieldable means connecting said rock shaft with the free ends of said arms for transmitting movement of said rock shaft to said arms, and manual means for rocking said rock shaft, said last mentioned means including means for securing the rock shaft at the desired fixed adjustment.

2. A stalk cutting attachment for tractors comprising in combination a sleeve, means for supporting the sleeve horizontally at the forward end of the tractor, a shaft rotatably mounted in the sleeve, a collar at each end of the sleeve and including a relatively large cylindrical portion embracing the sleeve, and a relatively small cylindrical portion embracing the shaft, arms connected with the shaft for rocking movement therewith, said arms extending downwardly and rearwardly, a cutter, means for rotatably supporting the cutter between the free ends of said arms, a rock shaft, means for supporting said rock shaft on the tractor, said rock shaft provided with crank arms, links pivotally connected with said crank arms and having loose connections with said arms, spring devices engaged with said links and said arms for normally urging the arms downwardly with respect to said links, and means for rocking said rock shaft.

3. A stalk cutter attachment for tractors comprising in combination a cutting device adapted to be located beneath the tractor rearwardly of the front wheels of the tractor, arms at the ends of the cutting device extending upwardly and forwardly with respect to the tractor, and means for rockably supporting the upper ends of said arms, said means including a sleeve, means for supporting the sleeve on the tractor, a shaft journaled in said sleeve and operatively connected at its ends with the forward ends of said arms, a collar at each end of said sleeve and including a relatively large split cylindrical portion embracing the sleeve, means for contracting said cylindrical portion about said sleeve, together with a relatively small cylindrical portion embracing the shaft.

4. In a device of the character described, a fixedly mounted sleeve, a shaft journaled in said sleeve, means for suspending a cutting device from said shaft, a collar at each end of said sleeve, said collar including a cylindrical portion of relatively large diameter embracing the sleeve, and a cylindrical portion of relatively small diameter embracing the shaft, and means for contracting the collar about the sleeve and shaft respectively.

In testimony whereof I affix my signature.

OSCAR THOMAS MINOR.